United States Patent [19]
Fisher et al.

[11] Patent Number: 5,988,882
[45] Date of Patent: Nov. 23, 1999

[54] OPENABLE BAG CONSTRUCTION

[75] Inventors: Mauro Fisher, Chicago, Ill.; Harold L. Benford, Joplin; Larry J. Reynolds, Seneca, both of Mo.; Dustin L. Rupert, Chetopa; Craig L. Schnieders, Baxter Springs, both of Kans.; Gary D. Updegraff, Joplin, Mo.; Ronald E. Warner, Columbus, Kans.

[73] Assignee: Bagcraft Packaging, L.L.C., Chicago, Ill.

[21] Appl. No.: 08/924,970

[22] Filed: Sep. 8, 1997

[51] Int. Cl.$^6$ ...................................................... B65D 33/00
[52] U.S. Cl. .......................... 383/207; 383/66; 383/109; 229/87.05
[58] Field of Search ............................ 383/207, 66, 109; 229/87.05

[56] References Cited

U.S. PATENT DOCUMENTS

| | | |
|---|---|---|
| 1,329,466 | 2/1920 | Miller ................................. 229/87.05 X |
| 2,128,374 | 8/1938 | Midulla ................................. 229/87.05 |
| 2,306,335 | 12/1942 | Feigenbutz . |
| 3,480,179 | 11/1969 | Rowland ............................ 229/87.05 X |
| 5,199,792 | 4/1993 | Roosa ..................................... 383/207 X |
| 5,335,996 | 8/1994 | Cortopassi et al. . |
| 5,507,579 | 4/1996 | Sorenson ................................... 383/207 |
| 5,560,945 | 10/1996 | Geddes et al. ......................... 383/207 X |

FOREIGN PATENT DOCUMENTS 2156303  10/1985  United Kingdom ................ 229/87.05

Primary Examiner—Jes F. Pascua
Attorney, Agent, or Firm—Fitch, Even, Tabin & Flannery

[57] ABSTRACT

A bag for carrying and exposing a food item, such as sandwich-type items sold at fast food or convenience stores. The bag includes front, back and gussetted side panels which are interconnected and form a V-shaped closed end and an open end. A pair of lines of weakness or perforations are provided, located on the front panel, extending between the open and closed ends, spaced apart a distance substantially less than the width of the front panel of the bag, which define a ripping strip. A pull tab is provided integral with the end of the ripping strip at the top end of the bag and extending therefrom to facilitate opening of the bag. Thus, the bag can be opened by grasping the pull tab and tearing the ripping strip along the lines of perforation so as to expose the bag interior and a food item therein for removal, application of condiments, and/or reuse of the bag to keep the food item warm or as a place mat to receive the food item for consumption. Moreover, the bag is fabricated of a multipurpose laminate having layers of tissue, adhesive, polycoat tissue and polyethylene. This laminate functions to enhance moisture and heat retention within the package and imprinting capability.

19 Claims, 1 Drawing Sheet

OPENABLE BAG CONSTRUCTION

BACKGROUND OF THE INVENTION

This invention relates generally to paper bags, and more specifically, to the type used in the convenience food industry to carry a food item, such as a sandwich, and to be opened to expose the bag interior and food item therein.

In the convenience or fast food industry, the bag in which a product is packaged and delivered to the customer is important. Presently, it is believed that the bags can be improved by providing easier and better access for the customer to the item carried therein, by preventing shifting of the food item such that it is preserved in its original, as-packaged condition, and by allowing the customer to reuse the bag in other applications, such as forming the bag into a place mat to allow for easy application of condiments thereon and to receive the food item during the meal.

Bags such as that disclosed in U.S. Pat. No. 2,306,335 to Feigenbutz, are used in the sale of foods such as fried chicken. The Feigenbutz bag includes a ripping strip on the front panel, which is defined by a pair of perforated lines spaced relatively close together and extending from the top edge to the bottom edge of the front panel of the bag. In use, an item of food is placed inside the bag through its open, upper end. The upper end of the bag is then folded over along a crease line and secured against the back panel of the bag by staples, tape or other securing means. The portion of the ripping strip located on the upper, folded back portion of the bag is ripped along the perforated lines to the crease line to form a pull tab, which projects freely and may be readily grasped and pulled down along the front panel to open the bag. When the consumer desires to access the chicken, he or she pulls the pull tab/ripping strip along the perforated lines, and then removes the chicken from the bag through the narrow slot or opening formed by tearing along the perforated lines. While the disclosed bag may be useful for fried chicken, and other food items where shifting of the food items during transport is unimportant, it is not believed useful for other items, such as sandwiches, or other multiple-piece food items which are placed in the bag in a certain position and are intended to remain in relatively the same position until the bag is opened for consumption of the food. Moreover, the ripping strip may be difficult to grasp and separate neatly from the folded over front panel.

U.S. Pat. No. 5,335,996 to Cortopassi, et al. discloses an openable bag construction for carrying and exposing food items, usually sold at fast-food type restaurants. The bag comprises an open top end, a closed bottom end, a front panel, a back panel and a pair of gusseted side panels. A pair of perforated lines are provided at the junctions of each side panel and the front panel. The perforated lines are parallel to each other, extend longitudinally between the open end and the closed end and are spaced apart the width of the front panel. In use, food is placed into the bag through its open end. The top of the bag is then folded closed to ensure that the contents of the bag remain warm. When the consumer desires to remove the food from the bag, he unfolds the top of the bag and pulls the front panel so as to separate the front panel from the side panels along the perforated lines. Since the perforations are located at the junctions of each side panel and the front panel, however, they are not readily visible unless one is specifically looking for them. Thus, since the bag does not incorporate any type of pull tab, the user may not be aware that the bag includes perforations.

SUMMARY OF THE INVENTION

Thus, it is an object of the invention to provide improved packaging for food items, particularly those such as confectionary, fast-food and similar items which are packaged at the point of sale.

It is another object of the invention to provide a bag system, such that the food item can be placed into the bag in a certain position and remain secure in that position until opening of the bag and consumption of same.

It is another object of this invention to provide a bag system, where the bag can be opened to permit easy access to and removal of the food item, and where the bag can be opened in such a manner as to be formed into a place mat such that condiments can be applied to the food item on the bag during a meal.

It is another object of this invention to provide a bag system of the type set forth which can be imprinted with logos and other advertisements.

It is another object of the invention to provide a bag system which includes perforations and a pull tab which are clearly visible to the user so as to encourage use thereof.

The bag of this invention meets the foregoing objects in that it provides desirable packaging for food products, provides for easy access to the bag interior and food removal, ensures that the food item remains relatively stable during transport, allows the user to reuse the bag as a place mat to apply condiments to the food and/or to receive the food during a meal, and provides a bag fabricated of a material which provides moisture and heat retention and is imprintable.

The bag includes an open end, a closed end, and front and back panels. A pair of lines of weakness or perforations are provided that extend between the open top and closed bottom. These lines are located on the front panel and are spaced a distance apart. A pull tab is provided integral with the top of the ripping strip, extending above the top edge of the front panel. With the foregoing construction, the food item can be inserted in the bag and will remain relatively secure during transport. The pull tab is readily apparent and accessible so that the bag can be opened and torn open along the perforations so as to expose the bag interior or contents for access or removal of the sandwich, application of condiments and/or reuse of the bag, for example, as a place mat.

Moreover, the bag may be fabricated of a laminate having layers of (from interior to exterior) tissue paper/adhesive/polycoat/paper which exhibits the desired moisture, heat retention and imprinting characteristics.

DESCRIPTION OF THE PREFERRED EMBODIMENT

Figure 1:
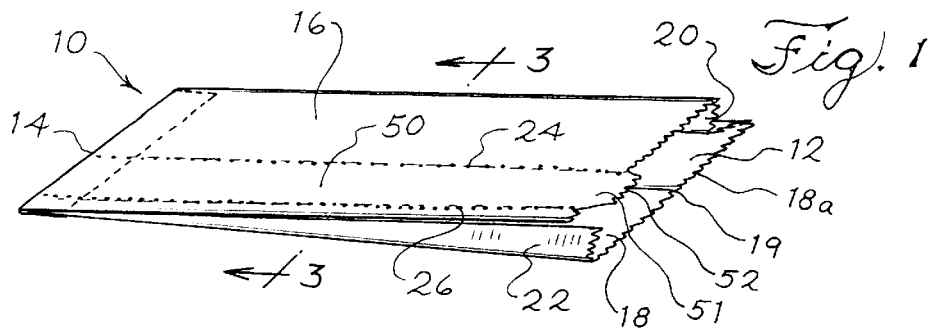
FIG. 1 is a perspective view of a bag of this invention.
Figure 2:
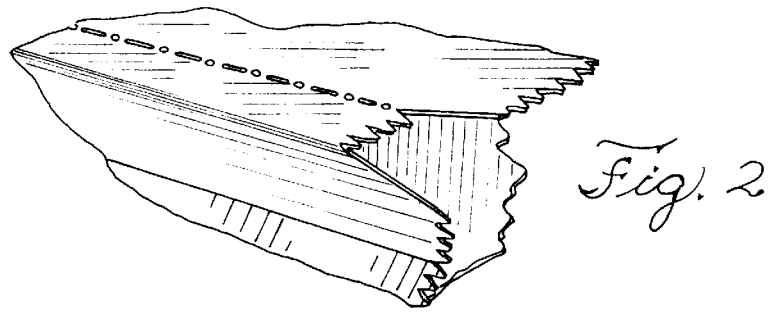
FIG. 2 is an enlarged, fragmentary, perspective view of a section of a perforation pattern used in a bag of the type shown in FIG. 1.
Figure 3:
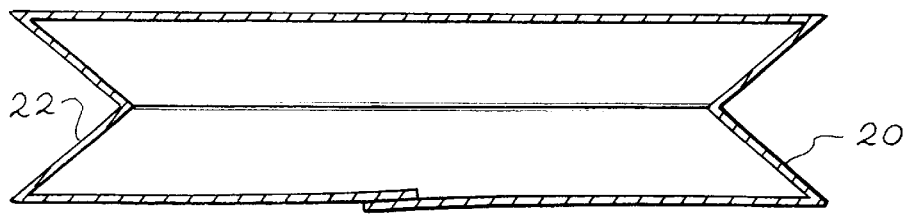
FIG. 3 is an enlarged sectional view taken along line 3—3 of FIG. 1.
Figure 4:
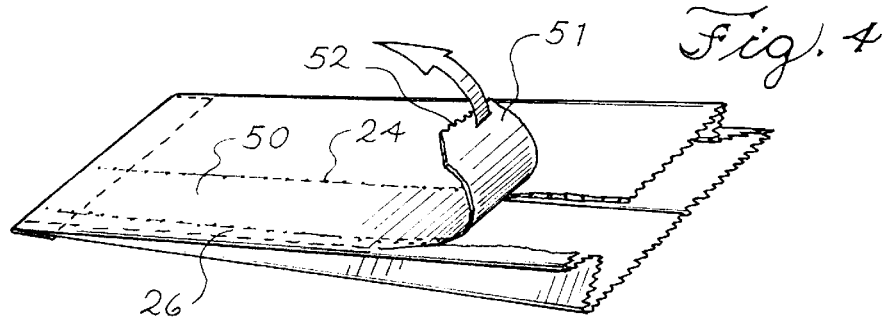
FIG. 4 is a view similar to FIG. 1, but showing the bag opened by the pull tab/ripping strip being pulled and separated along the lines of perforation.

Referring now to the drawings, particularly FIGS. 1 and 4, there is shown a bag 10 which has a body, an open end 12, and a closed end 14. The bag includes a front panel 16, a back panel 18, and a pair of gussetted side panels 20 and 22, which cooperate to form a peripheral wall structure. The wall structure is seamed, as at 19, to form the closed end 14, which is V-shaped and forms what is known as a pinch bottom. The front panel 16 may be shorter than the back panel 18.

A pair of lines of weakness or perforations 24 and 26 are provided on the front panel 16 spaced a distance apart. The lines of perforation are parallel to each other, extend longitudinally between the open end 12 and the closed end 14, and are spaced apart a relatively small distance substantially less than the width of the front panel 16, and define a ripping strip 50 spaced from both side panels 20 and 22, but preferably closer to one than the other. The perforations may be any of a number of commonly used types, and are designed to allow for consistent opening and minimize premature opening or tearing. A pull tab 51 is provided integral with the ripping strip 50 so as to ease opening of the bag. The pull tab 51 is coplanar with and projects from, the front panel 16 of the bag 10 at the open end thereof.

The bag is opened by grasping the top edge 52 of the pull tab 51 and pulling it toward the bottom of the bag, as best shown in FIG. 4. Desirably, the back panel 18 is fixed in position, at least along its top edge 18a, by holding it in place. The force on the pull tab 51 causes the ripping strip 50 to separate from the front panel 16 along the lines of perforation 24 and 26, exposing the bag interior and the food items therein.

Using this system, the bag interior is exposed, food items in the open bag can be removed without damage thereto, and, if desired, condiments can be applied to them. Moreover, the torn bag can be reused as a place mat or a receptacle for the food items. Thus, as in FIG. 4, a sandwich can be exposed, removed, dressed with condiments and returned to the bag to keep warm, or to receive the food item for consumption.

Figure 5:
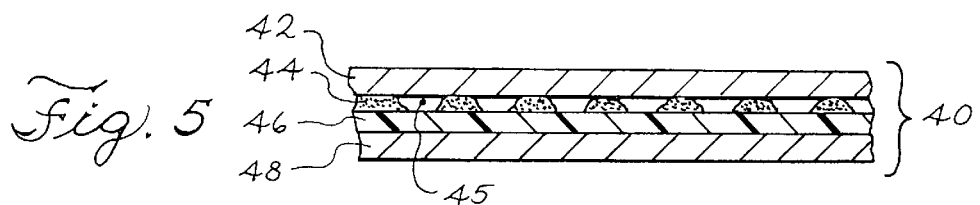
FIG. 5 is an enlarged, fragmentary, cross-sectional view of the material from which the bag is fabricated.

Referring now to FIG. 5, the bag is preferably fabricated of a laminate material 40 which exhibits moisture and heat retention, and imprinting properties and may be similar to that disclosed in U.S. Pat. No. 5,128,182. Desirably, bags made of material 40 absorb moisture from heated food as the food cools and absorbs liquid or juices from the food item within the package. Absorption is achieved by a tissue layer 42. The tissue layer is bonded or secured by an adhesive layer 44 applied in a honeycomb pattern to a polycoat layer. Polycoat layer refers to a polymer such as polyethylene 46 that may be coated (usually by a hot-melt process) onto the substrate, such as a tissue or an external layer 48, but the polyethylene cools to form its own layer. The polycoat layer is preferably a substantially fluid impervious layer under the conditions of normal use and is provided for minimizing moisture and heat from the bagged food item exiting the bag through the laminate. The adhesive in layer 44 is applied in a honeycomb pattern so as to form pockets such as 45 that enhance the heat retention properties of the bag and maximize the retention of heat from the food item in the package and minimize cooling thereof. Logos, corporate names, and other printing can be applied to the external layer 48. This layer is intended to be the exposed or external bag layer and may be perceived as the substrate for the polycoat.

This entire laminate is formed by known laminating techniques. The tissue may be a machine grade sandwich wrap with increased sizing for better release. The polycoat may be a tissue material which is coated with white low density polyethylene. The adhesive may be a vinyl emulsion for bonding the substrate and withstanding degradation from greasy products.

In one embodiment, the lines of perforation are formed using a perforation pattern that is at an angle to the score line and alternates back and forth to form a saw-tooth like pattern when torn. Each perforation may be about ¼ inch long. An alternate chain style pattern may include a 0.125 inch long perforation and a 0.0156 inch land area. The laminate is then formed into a bag by known bagmaking techniques so that the lines of perforations are aligned with the folds that form the junctions of each side panel 20 and 22 with the front panel 16.

In use, the formed bag is loaded with a food item, such as a sandwich. The customer may then carry the bagged item to an eating area and lay the bag down with the bag back panel on the table or support surface and the front panel facing upwardly. The bag can then be torn open by grasping the pull tab and separating the ripping strip from the front panel along the lines of perforation so as to expose the food item. Then, the sandwich can be removed and condiments, if desired, can be applied to the food item and then eaten. If so desired, the torn bag can be formed into a place mat so as to receive the food item during the meal and the bag thus reused.

The invention has been described above in an illustrative manner and it is to be understood that terminology which has been used is intended to be in the nature of description rather than of limitation. Obviously, many modifications and variations of the present invention are possible in light of the above teachings. It is therefore to be understood that within the scope of the appended claims, the invention may be practiced otherwise than as specifically described.

What is claimed is:

1. A bag for use in carrying a food item, which bag comprises a peripheral wall structure including an open, unreinforced, unsealed end and a closed end, a panel formed by the wall structure with a width and at least two opposing borders, the panel and borders extending generally from said open end to said closed end of the bag;

a pair of frangible lines located on said wall structure panel; said frangible lines extending generally from said open end to said closed end of the bag and forming a single ripping strip therebetween with a width less than the panel width;

a pull tab integral with said ripping strip, the pull tab having a preformed gripping surface at least a portion of which extending past the open end of the bag and the pull tab and gripping surface disposed generally coplanar with the panel at the time of use; and the pair of frangible lines disposed relative to the panel borders forming asymmetrical first and a second sections in the panel, the first section having a substantially continuous surface and with a width for generally extending over a substantial portion of the food item carried within the bag as the ripping strip is removed from the panel by grasping said pull tab and separating said ripping strip from said wall structure along said frangible lines so as to expose a portion of a food item carried in the bag and facilitate removal of the food item from the bag.

2. A bag as in claim 1, said wall structure being fabricated of at least two sheets of material laminated together, capable of absorbing and retaining moisture and heat from a food item and of being imprinted.

3. A bag as in claim 2, wherein said sheets of material include an interior tissue layer for moisture absorption, and adhesive applied in a manner so as to cooperate in forming pockets for heat retention and for bonding adjacent layers, and a polycoat layer of tissue and polyethylene bonded to the adhesive layer and being substantially heat and moisture impervious so as to retain said heat and moisture in said bag and for imprinting thereon.

4. A bag as in claim 1, wherein the frangible lines are defined by a chain-style perforation pattern which includes a perforation of about 0.125 inch and with a land area of about 0.0156 inch between perforations.

5. A bag as in claim 1, wherein the frangible lines are defined by a perforation pattern which includes a plurality of perforations each angularly disposed alternately back and forth to form a saw-tooth like pattern.

6. The bag of claim 1, wherein the wall structure includes a front panel and a back panel and side panels.

7. A bag as in claim 6, wherein the front panel is shorter than the back panel.

8. A bag as in claim 6, wherein said frangible lines are lines of perforation and are located one of the front panel or back panels.

9. A bag as in claim 8, wherein said lines of perforation are closer to one side panel than to the other side panel.

10. A bag as in claim 9, wherein said lines of perforation are spaced from said side panels.

11. A bag as in claim 8, wherein said pull tab is coplanar with said one of said panels and is closer to one of the side panels than the other of the side panels.

12. A bag as in claim 1, wherein the width of said pull tab is less than the width of the ripping strip, and the pull tab is provided with a distal end spaced from the panel section a distance effective to form the gripping surface thereon and visible indicator of the pull tab location and the pull tab projects from said open end of said bag.

13. A bag for enclosing and transporting a food item comprising:

a wall structure generally defining the bag enclosure, the wall structure including a first closed end, and an unreinforced, unsealed, opposite second end having a peripheral border defining an opening to the food product enclosure, the second end foldable from a first open position to a second closed position, and the wall structure defining at least one panel extending generally from the first closed end to the second foldable end of the wall structure;

the panel having a predetermined width and at least two spaced, frangible zones extending generally from the first closed end to the opening with a single ripping strip defined between the frangible zones;

a predimensioned pull tab integral with the ripping strip having a width less than the panel width, the pull tab disposed generally coplanar with the panel at the time of use and positioned at the peripheral border of the second foldable end, the pull tab provided with a distal end spaced beyond the open end of the panel a distance effective to form a gripping surface thereon and a visible indicator of the pull tab location;

the ripping strip selectively separable from the panel along the frangible zones to open and expose at least a portion of the bag enclosure when the pull tab is grasped and used to exert separating force on the ripping strip, and the frangible zones disposed to form at least one asymmetric, panel section when the ripping strip is separated from the panel;

the panel section having a width greater than one-half of the width of the panel and a substantially continuous and imprintable surface, the panel section moveable to a position for substantially covering the food within the bag protecting and maintaining the warmth of the food carried within the bag.

14. The bag of claim 13 wherein the wall structure is provided with gusseted side panels extending generally from the first closed end to the second foldable end of the wall structure, and a second peripheral border generally contiguous with the first closed end, the wall structure movable at the the gusseted side panels from a first position generally enclosing the food item to a second generally planar position after the ripping strip is removed.

15. The bag of claim 14, wherein the panel is a front panel and the ripping strip has a width less than that of the front panel; the wall structure further provided with a back panel opposite the front panel and side panels connecting the front and back panels; the front, back and side panels having edge portions defining the peripheral border of the second foldable end of the wall structure.

16. The bag of claim 15 wherein the ripping strip is offset towards one side panel forming asymmetrical first and second front panel sections; the first front panel section having a width for generally covering a substantial portion of a food item within the bag and to form a substantially continuous surface for printed indicia after the ripping strip is separated from the front panel.

17. The bag of claim 16 wherein the gusseted side walls include at least one fold line extending generally from the second end of the wall structure to the first end of the wall.

18. The bag of claim 17 wherein the pull tab leading edge is spaced from the front panel a distance effective to form a gripping surface and visual indicia of the pull tab location when the second foldable end of the bag is at least in its open position.

19. The bag of claim 13 wherein the front panel, back panel and side panels are provided with inner surfaces and a length and width with respect to the wall ends, the front panel, back panel, and side panel length and width preselected to provide contact between the panel inner surfaces the food product, the inner surface contact effective to maintain the food product generally a consistent position relative to the wall structure.

* * * * *

UNITED STATES PATENT AND TRADEMARK OFFICE
CERTIFICATE OF CORRECTION

PATENT NO. : 5,988,882
DATED : November 23, 1999
INVENTOR(S) : Mauro Fisher et al.

It is certified that error appears in the above-identified patent and that said Letters Patent is hereby corrected as shown below:

Column 5,
Line 19, change "located one of the front panel" to -- located on one of the front or --.

Column 6,
Line 21, delete the second occurrence of "the".

Signed and Sealed this

Sixteenth Day of October, 2001

Attest:

NICHOLAS P. GODICI
Attesting Officer
Acting Director of the United States Patent and Trademark Office